US008053065B2

(12) United States Patent
Ortmeier et al.

(10) Patent No.: US 8,053,065 B2
(45) Date of Patent: Nov. 8, 2011

(54) FLEXIBLE LAYER COMPOSITE COMPRISING A SUPPORT AND A LAYER OF CURABLE SURFACE COATING COMPOSITION APPLIED THERETO

(75) Inventors: Jürgen Ortmeier, Kirchheim (DE); Ottfried Klein, Esslingen (DE); Terry Djunaidi, Stuttgart (DE)

(73) Assignee: Karl WorKwag Lack- und Farbenfabrik GmbH & Co. KG, Stuttgart (DE)

( * ) Notice: Subject to any disclaimer, the term of this patent is extended or adjusted under 35 U.S.C. 154(b) by 1119 days.

(21) Appl. No.: 11/578,586

(22) PCT Filed: Apr. 13, 2005

(86) PCT No.: PCT/EP2005/003866
§ 371 (c)(1),
(2), (4) Date: Aug. 15, 2007

(87) PCT Pub. No.: WO2005/099943
PCT Pub. Date: Oct. 27, 2005

(65) Prior Publication Data
US 2008/0220250 A1 Sep. 11, 2008

(30) Foreign Application Priority Data
Apr. 16, 2004 (DE) .......... 10 2004 019 460
Nov. 5, 2004 (DE) .......... 10 2004 055 363

(51) Int. Cl.
B32B 27/32 (2006.01)
B32B 17/10 (2006.01)
B32B 27/40 (2006.01)
B32B 27/00 (2006.01)
C07D 295/18 (2006.01)

(52) U.S. Cl. ..... 428/220; 428/332; 428/339; 428/423.1; 428/500; 106/316

(58) Field of Classification Search .......... None
See application file for complete search history.

(56) References Cited

U.S. PATENT DOCUMENTS

| 6,258,441 | B1 | 7/2001 | Oguchi et al. |
| 6,835,420 | B1 * | 12/2004 | Rockrath et al. ........... 427/407.1 |
| 2011/0123732 | A1 * | 5/2011 | Foley et al. .................. 428/32.6 |

FOREIGN PATENT DOCUMENTS

| DE | 199 17 965 | | 10/2000 |
| DE | 19917965 | | 10/2000 |
| DE | 101 40 769 | | 3/2003 |
| DE | 10140769 | | 3/2003 |
| DE | 10 2004 009 437 | | 9/2005 |
| EP | 0 361 351 | | 9/1988 |
| EP | 0 810 520 | | 12/1997 |
| WO | WO 00/13893 | | 3/2000 |
| WO | WO 2005/080484 | | 2/2005 |
| WO | WO2005/080484 | * | 9/2005 |
| WO | WO 2005/080484 | | 9/2005 |

OTHER PUBLICATIONS

Schwalm, R. "Crosslinking Effect on Mechanical Properties of UV Curable Coatings" XP008009160, PPCJ Polymers Paint Colour Journal, FMJ International, Oct. 1999, pp. 18-22.

* cited by examiner

Primary Examiner — Sheeba Ahmed
(74) Attorney, Agent, or Firm — Antonelli, Terry, Stout & Kraus, LLP.

(57) ABSTRACT

In a flexible layer composite comprising a support and at least one curable surface coating composition applied to the support, the layer of curable surface coating composition comprises
  a binder which contains double bonds and has a double bond density in the range from 3 mol/kg to 6 mol/kg, a transition glass temperature $T_g$ in the range from −15° C. to 20° C. and a solids content in the range from 40% to 100%,
  if appropriate at least one surface coating auxiliary, preferably a surface coating auxiliary combination,
  if appropriate solvents and
  if appropriate pigments and/or fillers
and is not sticky after thermal drying. At least one removable protective layer, preferably a removable protective film, has preferably been applied to the layer of curable surface coating composition.

35 Claims, No Drawings

FLEXIBLE LAYER COMPOSITE COMPRISING A SUPPORT AND A LAYER OF CURABLE SURFACE COATING COMPOSITION APPLIED THERETO

CROSS REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC:

Not Applicable

BACKGROUND OF THE INVENTION

1. Field of the Invention

The invention relates to a flexible layer composite comprising a support and at least one layer of curable surface coating composition applied to the support and also uses of such a layer composite. The invention further relates to three-dimensional shaped bodies coated with this layer composite and also the surface coating composition which is applied to the support.

2. Background Art

Conventional surface coatings, in particular conventional motor vehicle coatings, usually consist of a plurality of superposed layers of surface coating compositions. However, due to the process, it is frequently difficult to achieve precisely color-matched coatings, e.g. on various substrates such as sheet metal or plastic. Different color shades also result on identical substrates due to even minimal changes in the surface coating components used or a process step.

To solve these problems, multilayer composites comprising a layer of curable surface coating composition applied to a support can be employed in place of conventional surface coatings to coat the respective substrates. In particular, surface coating films in which the support is a film may be mentioned here. The application of these surface coating films forms a coating having a substrate- and process-independent color shade, which considerably simplifies color quality management, for example in automobile construction where finished, coated individual components are usually procured from different suppliers. A further advantage of the use of surface coating films is that no solvent emissions, or comparatively low solvent emissions, occur when they are applied.

WO 00/13893 discloses surface coating films coated with a plurality of layers, with the surface of a plastic film A being coated with at least one surface coating layer and the surface coating layer optionally being coated with a further thermoplastic film B. The plastic film A may, if desired, be able to be pulled off from the surface coating layer which has been applied to a substrate and cured, so that only the surface coating layer remains on the substrate. The surface coating composition used comprises a binder based on polyester, polyurethane or polyacrylate and a crosslinker (an amino resin, a polyisocyanate resin or a carboxyl-containing crosslinker).

EP 361 351 A1 discloses a process according to which a surface coating film comprising a support film, an adhesive layer and a surface coating layer can be applied to three-dimensional curved surfaces. To protect against contamination, the radiation-curable surface coating layer of the surface coating film is partially cured by means of radiation so that it is dust-dry. The surface coating film is subsequently heated and applied. After application, the surface coating layer is subjected to final curing by thermal means.

EP 0 819 520 A2 claims a process for applying a surface coating film comprising at least one surface coating layer and an adhesive layer to three-dimensional curved surfaces, in which the radiation-curable surface coating layer of the surface coating film is partially cured so as to be dust-dry before application to the curved surface and it is subjected to final curing after application. Here, the final curing of the surface coating layer is effected by means of electromagnetic radiation having a wavelength shorter than the wavelength of the visible spectrum. To apply the surface coating film to the substrate, the surface coating layer is preferably heated to its glass transition temperature $T_g$ or slightly above this in order to be able to apply the surface coating film without bubbles, creases and an "orange skin" surface. A surface coating having a glass transition temperature $T_g$ of less than 40° C., in particular less than 30° C., is therefore chosen. The surface coating comprises a binder based on phospacene, urethane or acrylate.

A fundamental problem which occurs in these processes is the susceptibility of the surface coating films used to contamination, in particular by means of dust. Weeks to months can elapse between the time when they are produced until they are processed. If the surface coating composition comes into contact with contaminants during this time, this frequently leads to undesirable optical changes in the surface of the coating. Contaminants of all types have to be avoided at all costs for this reason. In industrial practice, this means that the cleanliness of storage and production buildings has to meet exacting requirements.

One possible measure for reducing these problems is to provide the surface coating layer of a surface coating film with a protective covering or film during or immediately after it has been produced.

Thus, DE 101 40 769 A1 discloses surface coating films in which a polypropylene film is provided with a layer of a clear coating onto which a colored surface coating layer has in turn been applied. To ensure that the surface coating film can be removed from the substrate again without leaving residues, an adhesive layer was applied to the colored surface coating layer and a reinforcing film was in turn laminated on top of this. A release film was laminated onto the reinforcing film to cover it until processing. To ensure sufficient adhesion of the release film to the composite, the use of a further adhesive layer between release film and reinforcing film is necessary.

In general, use of protective films whose use is associated with the use of adhesives is not optimal from a number of points of view. When the protective film is removed, it may be desirable, in particular, for the underlying adhesive layer to be able to be removed as well without leaving residues. In practice, difficulties can occur here. In addition, application of a protective film by means of adhesive to a surface coating layer to be protected requires an additional process step.

Surface coatings having high $T_g$ values are in principle insensitive to contamination, and protection of the surface coating is then not absolutely necessary.

DE 199 17 965 describes a radiation-curable composite layer plate or film comprising at least one substrate layer and a covering layer, with the covering layer comprising a radiation-curable composition containing a binder having a glass transition temperature $T_g$ of above 40° C., preferably above 50° C., in particular above 60° C. The application of a protective layer is accordingly mentioned as a purely optional measure.

However, the use of surface coatings which contain binders having a high glass transition temperature $T_g$ also has disadvantages. Application of a surface coating film is preferably carried out at elevated temperatures, in particular at temperatures above the glass transition temperature $T_g$ of the radiation-curable binder. $T_g$ values which are too high result in poor handling of the physically dried film of surface coating at room temperature. The surface coating is then too brittle; in particular, it is not able to undergo deep drawing and has a tendency to crack formation.

BRIEF SUMMARY OF THE INVENTION

It is accordingly an object of the invention to provide a layer composite which represents a solution to the problems addressed. The main objective is to provide a layer composite having a surface coating layer which has particularly advantageous properties in respect of protection against contamination, in particular with regard to the application of a protective film.

To achieve this object, the invention proposes a layer composite having the features of claim 1. Preferred embodiments of the subject matter of the invention according to claim 1 are described in dependent claims 2 to 20. The uses of the layer composite according to the invention as specified in independent claims 21 and 24 are also subject matter of the present invention. A preferred embodiment of the use according to the invention as specified in claim 21 is indicated in claim 22. The invention likewise provides three-dimensional shaped bodies having the features of claim 23, the curable surface coating composition according to claim 25, whose preferred embodiments are described in claims 26 to 28, and also the cured surface coating according to independent claim 29. The wording of all claims is hereby incorporated by reference into the present description.

BRIEF DESCRIPTION OF THE SEVERAL VIEWS OF THE DRAWING

Not Applicable

DETAILED DESCRIPTION OF THE INVENTION

A layer composite according to the invention comprises a support and at least one layer of curable surface coating composition applied to the support. The layer of curable surface coating composition contains a binder which is characterized by having a double bonded density in the range from 3 mol/kg to 6 mol/kg, a glass transition temperature $T_g$ in the range from −15° C. to 20° C. and a solids content in the range from 50% to 100%.

The glass transition temperature $T_g$ in particular is of particular importance in respect of protection of the layer of curable surface coating composition from contamination, which will be discussed in more detail below.

The layer of curable surface coating composition may, if appropriate, comprise at least one surface coating auxiliary, preferably a surface coating auxiliary combination. The surface coating auxiliary combination can comprise all commercial auxiliaries which are required in addition to the surface coating raw materials to produce surface coating compositions, in particular auxiliaries which serve to set and stabilize the properties of surface coating compositions. Examples are photoinitiators such as α-hydroxyalkylphenones or acylphosphine oxides (e.g. Irgacure 184, Irgacure 819), light stabilizers such as commercial UV absorbers such as hydroxybenzophenones, benzotriazoles, oxalanilides and free-radical scavengers such as sterically hindered amines (HALS), surface additives such as leveling agents and antifoams (e.g. TegoGlide 435, Byk 051), emulsifiers and wetting agents and dispersants.

Further optional components of the layer of curable surface coating composition are
solvents and
pigments and/or fillers.

As pigments, it is possible to add both inorganic and organic pigments. Possible fillers are all appropriate additives known to those skilled in the art, e.g. silica gels or talc. However, the layer of curable surface coating composition is preferably a clear coating.

When the layer of curable surface coating composition is dried, in particular thermally dried, the (only partially cured) surface coating layer resulting from drying is not sticky.

The binder is preferably a binder based on urethane acrylate.

The binder is particularly preferably one having a glass transition temperature $T_g$ in the range from −10° C. to 12° C.

In a particularly preferred embodiment, the 100% strength binder is a solid (solids content of the binder=100%).

As a result of the comparatively low $T_g$, the layer of curable surface coating composition can be susceptible to contamination, in particular by dust. Accordingly, a layer composite according to the invention particularly preferably has at least one removable protective layer, preferably a removable protective film, on the layer of curable surface coating composition.

In the production of a layer composite according to the invention, application of the layer of curable surface coating composition is followed by surface drying of the applied layer of curable surface coating composition, usually at temperatures in the range from 70° C. to 120° C., preferably from 100° C. to 120° C.

It has surprisingly been found that the layer of curable surface coating composition after this drying has particularly advantageous properties in respect of the application of preferably a protective film if a binder which has a glass transition temperature $T_g$ in the range from −15° C. to 20° C., in particular from −10° C. to 12° C., is used as binder. Despite the surface drying, a removable protective layer, in particular a protective film, can be applied without problems to the surface of the coating and adheres to the layer of the curable surface coating composition without requiring the use of adhesives. It has likewise surprisingly been found that a protective layer applied in this way can be pulled off again from the layer of curable surface coating composition without problems despite the good adhesion mentioned. After the protective layer has been pulled off, the exposed surface coating layer is in excellent optical condition: a mirror-like surface results.

A removable protective layer preferably has a thickness in the range from 10 μm to 100 μm, in particular from 20 μm to 60 µm. It is particularly advantageous for the removable protective layer to be a single-layer or multilayer film.

The removable protective layer is usually a plastic film, in particular a film based on polyesters, polyolefins, polycarbonates, acrylonitrile-butadiene-styrene (ABS), acrylic-styrene-acrylonitrile (ASA), acrylonitrile-butadiene-styrene/polycarbonate (ABS/PC), acrylic-styrene-acrylonitrile/polycarbonate (ASA/PC), polycarbonate/polybutylene terephthalate (PC/PBT) or other suitable plastics known to those skilled in the art or mixtures thereof. Particular preference is given to a protective layer based on polyethylene terephthalate.

However, the use of protective layers composed of materials other than plastic, e.g. metal, is sometimes also conceivable.

It is also worth mentioning that it is possible to apply structures to the surface of the coating via the protective layer. For this purpose, the protective layer can have been provided with an appropriate negative pattern.

Furthermore, it can be advantageous for the protective layer to be opaque to light and/or UV.

It can equally well be advantageous for the protective film to be transparent to light and/or UV. It is in this case possible, for example, to illuminate or irradiate layers located underneath the protective film through the protective film. The removal of the protective film can then be undertaken only after these processes are concluded.

In a preferred embodiment, a layer composite according to the invention likewise has a single-layer or multilayer film as support. This (support) film, too, is preferably a plastic film, particularly preferably a plastic film which can be subjected to deep drawing, in particular a film based on polyolefins, polycarbonates, acrylonitrile-butadiene-styrene (ABS), acrylic-styrene-acrylonitrile (ASA), acrylonitrile-butadiene-styrene/polycarbonate (ABS/PC), acrylic-styrene-acrylo-nitrile/polycarbonate (ASA/PC), polycarbonate/poly-butylene terephthalate (PC/PBT) or other suitable plastics known to those skilled in the art or mixtures thereof.

A film having a thickness in the range from 100 µm to 1500 µm, in particular from 200 µm to 1300 µm, is preferably selected as support.

In some cases, it can be preferred that the (support) film contains pigments, in particular is colored. In addition or instead, the (support) film can, like the protective film, contain commercial fillers.

In a preferred embodiment of a layer composite according to the invention, the layer of curable surface coating composition which is applied to the support is at least partially thermally curable. Preference is likewise given to the layer of curable surface coating composition being at least partially curable by means of radiation, preferably by means of electromagnetic radiation, in particular by means of UV radiation. The use of electron beams is also possible.

Particular preference is given to the layer of curable surface coating composition being at least partially curable both by thermal means and by means of electromagnetic radiation.

The layer of curable surface coating composition on the support preferably has a thickness of from 10 µm to 150 µm, in particular from 30 µm to 70 µm.

In a preferred embodiment of the layer composite of the invention, the layer of curable surface coating composition is applied directly to the support. This can be the case when, in particular, the support is a colored (support) film or when the support comprises a colored film.

However, preference is likewise given to at least one further surface coating layer, in particular a color- and/or effect-imparting surface coating layer, being present between the support and the layer of curable surface coating composition.

This further surface coating layer is preferably a water-based surface coating composition. Such a suitable surface coating composition basically has to be, depending on the processing method, capable of being applied by doctor blade, sprayed and/or pumped. Suitable surface coatings are thermoformable, preferably in, inter alia, the range from 120° C. to 210° C. In particular, they have a high thermal stability. No significant color change occurs during the course of the process.

A layer composite according to the invention preferably has a layer sequence in which at least one layer of curable surface coating composition has been applied to a support and at least one removable protective layer has in turn been applied to the at least one layer of curable surface coating composition. In a further development, a layer composite particularly preferably has precisely one layer of curable surface coating composition and one removable protective layer.

A likewise preferred embodiment of a layer composite according to the invention has a layer sequence in which at least one further surface coating layer in particular at least one color- and/or effect-imparting surface coating layer, has been applied to a support and at least one layer of curable surface coating composition followed by at least one removable protective layer have been applied on top of this at least one further surface coating layer. In a further development, a layer composite in this case, too, particularly preferably has precisely one layer of curable surface coating composition and one removable protective layer.

The layer composite is preferably intended for one-sided application, preferably on the side of the support facing away from the applied layer of curable surface coating composition. Application is preferably carried out by backinjection or back-foaming or else by adhesive bonding.

The layer composite according to the invention is particularly preferably intended for full-area application, but application to a substrate by means of pointwise application is also possible.

A layer composite according to the invention is preferably used for coating three-dimensional shaped bodies. In particular, the three-dimensional shaped body is a vehicle body or a part thereof, an externally mounted fitting on a vehicle, vehicle windows or vehicle interior components. However, all substrates having preferably smooth surfaces can in principle be provided with the layer composite of the invention, e.g. transport means such as railroad wagons or the shells or casings of electronic equipment, e.g. mobile transmitters.

Accordingly all three-dimensional shaped bodies which are coated with a layer composite according to the invention are subject matter of the present invention.

A further preferred use of a layer composite according to the invention is in a multiple stage application process having the following steps:
 removal, preferably pulling-off, of the protective layer from the layer of curable surface coating composition,
 thermoforming, in particular deep drawing, of the layer composite,
 final curing of the layer of partially cured surface coating composition, in particular by means of UV radiation.

The protective layer is preferably pulled off before thermoforming (deep drawing). This is unavoidable, in particular, when using protective films which are not thermoplastic. However, when thermoplastic protective layers are used, it is also conceivable for them to be removed only after deep drawing, if appropriate after final curing of the surface coating composition or only during or after installation of the shaped part to which the layer composite has been applied.

A curable surface coating composition according to the invention comprising essentially from 40% by weight to 100% by weight of a binder containing double bonds, at least one surface coating auxiliary, preferably a surface coating auxiliary combination, in a proportion of from 0% to 15% by weight, a proportion of solvent of up to 60% by weight and, if appropriate, pigments and/or fillers.

The binder has, as mentioned above, a double bond density in the range from 3 mol/kg to 6 mol/kg, a glass transition temperature $T_g$ in the range from −15° C. to 20° C., preferably from −10° C. to 12° C., and a solids content in the range from 50% to 100%. Regardless of the abovementioned proportion of solvent of up to 60% by weight in the curable surface coating composition according to the invention, the binder can also have a proportion of solvent.

As mentioned above, the curable surface coating composition according to the invention preferably comprises a binder based on urethane acrylate. The optional components surface coating auxiliaries, pigments and/or fillers have likewise been described above.

The lack of stickiness of the surface coating layer resulting after thermal drying and, associated therewith, the fact that the binder is, in particular, present in 100% strength form as solid have likewise been discussed above.

As solvent, a curable surface coating composition according to the invention preferably contains an organic solvent, in particular an ester or a ketone. Examples are butyl acetate and methyl isobutyl ketone (MIBK).

A cured surface coating according to the invention can be produced by curing of a surface coating composition according to the invention. It has a high resistance to chemicals such as sulfuric acid or sodium hydroxide solution. Ferments such as pancreatin also do not lead to damage to the surface of the coating.

Furthermore, it has excellent mechanical properties, in particular a high scratch resistance. The degree of gloss can be set to anywhere between matt and high-gloss, and particular effects such as metallic effects can likewise be produced.

Example 1

A coextruded three-layer composite film having the layer sequence ABS/PC-PC-ABS/PC and a thickness of 1000 μm is subjected to corona pretreatment to improve the adhesion between the layers to be joined. A colored surface coating composition (Wörwag waterborne base coating brilliant silver 105628) is subsequently applied to one side of the composite film. After a short airing phase, the film coated with the colored surface coating composition is dried at 110° C. for a period of 20 minutes in a convection oven. This is followed by a cooling phase of 5 minutes at 22° C. and 60% relative atmospheric humidity.

A curable surface coating composition is subsequently applied to the layer of waterborne base coating in a further process step. The curable surface coating composition is made up of the following components (figures in % by weight):
  70% of a curable binder
  2.0% of Irgacure 184 (Ciba Specialty Chemicals)
  0.3% of Irgacure 819 (Ciba Specialty Chemicals)
  0.5% of Tinuvin 400 (Ciba Specialty Chemicals)
  0.7% of Tinuvin 292 (Ciba Specialty Chemicals)
  2.0% of Tegoglide 435 (Tego Chemie)
  2.0% of Byk 051 (Byk-Chemie)
  22.5% of solvent.

The binder is a binder based on urethane acrylate and has a glass transition temperature $T_g$ of 10° C., a double bond density of 4.5 mol/kg and a solids content of 70%. Irgacure 184 and Irgacure 819 are commercial photoinitiators, and Tinuvin 400 and Tinuvin 292 are commercial UV absorbers. Tegoglide 435 and Byk 051 are surface additives known to those skilled in the art. Butyl acetate is used as solvent. Independently of this, the binder also contains a proportion of butyl acetate as solvent.

The application of this surface coating composition is followed by an airing phase for a period of 15 minutes at 22° C. and 60% relative atmospheric humidity. In a further process step, the film which has now been provided with two layers of surface coating is dried at 100° C. This results in partial curing of the binder and, associated therewith, also the surface coating. A cooling phase for a period of 5 minutes at 22° C. at 60% relative atmospheric humidity follows. The surface coating film obtained has an essentially dust-dry film of surface coating on the surface. A protective film of polyethylene terephthalate having a thickness of 50 μm is subsequently laminated onto this film of surface coating at a temperature of 50° C. The protective film adheres firmly to the film of surface coating without adhesive, but can also be pulled off again without problems, without visible damage to the reexposed surface of the coating occurring.

In the surface coating film produced in this way, the colored surface coating layer has a thickness of from 7 μm to 60 μm. The thickness of the partially cured film of surface coating is, likewise dependent on drawing, from 35 μm to 70 μm (before thermoforming). The values given relate to a surface coating film before thermoforming; the layer thicknesses are basically dependent on color shade and drawing and can accordingly vary.

Example 2

The determination of the residue stickiness or the degree of drying of the dried film of surface coating was carried out as follows:

Using a method analogous to Example 1, the curable surface coating composition described in Example 1 was applied to a film after application of the waterborne base coating. The resulting surface coating layer was thermally dried (15 minutes at room temperature, 20 min at 100° C.). The test specimen was then cooled to 10° C. The test specimen was then loaded with a weight for a period of 60 seconds at a temperature of 10° C. A rubber disk and a filter paper were located between the weight and the test specimen, with the filter paper lying directly on the test specimen. The mass of the weight and the contact area (area of the rubber disk) gives the specific loading. Evaluation was carried out according to the following table:

| Degree of drying | Specific loading [g/cm2]/loading time | Evaluation |
| --- | --- | --- |
| 1 | Scattering of glass beads on the surface | The glass beads can easily be removed again without leaving a residue by means of a soft brush |
| 2 | 5/60 s | The paper does not stick to the coating |
| 3 | 50/60 s | The paper does not stick to the coating |
| 4 | 500/60 s | The paper does not stick to the coating; a change (e.g. embossing) can be seen on the surface |

-continued

| Degree of drying | Specific loading [g/cm2]/loading time | Evaluation |
|---|---|---|
| 5 | 500/60 s | The paper does not stick to the coating; a change (e.g. embossing) cannot be seen on the surface |

The surface coating layer had a degree of drying of 4.

A surface coating layer which, as a change from before, is based on a binder having a $T_g$ of −10° C. had a degree of drying of 2 according to the test. Problem-free application and pulling-off of a protective film was also ensured in this case.

Example 3

To produce a shaped plastic part coated with a surface coating film, the laminated-on protective film is pulled off from a surface coating film produced as described in Example 1. The surface coating film is placed in a deep-drawing mold. Thermoforming is carried out in a conventional fashion. After deep drawing, the partially cured film of surface coating is subjected to final curing by means of UV radiation. The finally cured surface coating film is then placed in an injection-molding tool and a plastic is injected behind it in a customary way.

Example 4

To produce a shaped plastic part coated with a surface coating film, the laminated-on protective film is pulled off from a surface coating film produced as described in Example 1. The surface coating film is placed in a deep-drawing mold. Thermoforming is carried out in a conventional fashion. After deep drawing, the partially cured film of surface coating is subjected to final curing by means of UV radiation. The finally cured surface coating film is then backfoamed with a plastic in a customary way.

Example 5

A urethane-based binder suitable for producing a curable surface coating composition according to the invention preferably comprises the following isocyanate constituents in the following proportions:

| Allophanate derived from HDI and HEA | 55 mol % of NCO |
|---|---|
| Isocyanurate (based on IPDI) | 45 mol % of NCO. |

The abbreviations HDI, HEA and IPDI are customary abbreviations for the compounds hexamethylene diisocyanate, hydroxyethyl acrylate and isophorone diisocyanate. The figures in mol percent are in each case based on the total amount of NCO groups in the binder.

As alcohols, the binder preferably comprises the following constituents in the following proportions:

| Dicyclohexanolpropane | 40 mol % of OH |
|---|---|
| Hydroxyethyl acrylate | 27.5 mol % of OH |
| Pentaerythritol tri/tetra-acrylate | 27.5 mol % of OH |
| Methanol | 5 mol % of OH |

In a manner analogous to the figures for the isocyanate constituents, the mol percent figures given here are also based on the total amount of OH groups in the binder.

Particular preference is given to the alcohol component of the binder being present in an equimolar amount relative to the isocyanate component, so that the total amount of OH groups in the binder corresponds to the total amount of NCO groups.

In addition to the alcohol and isocyanate constituents mentioned, the binder usually further comprises the following constituents:

| Hydroquinone monomethyl ether | 0.05% by weight |
|---|---|
| 1,6-di-tert-butyl-para-cresol | 0.1% by weight |
| Dibutyltin dilaurate | 0.04% by weight |

The percentages by weight indicated are based on the solids present in the binder (the sum of all OH constituents and all NCO constituents).

In a general method of preparing the binder from the constituents mentioned, dicyclohexanolpropane is dispersed in hydroxyethyl acrylate at 60° C. with stirring. The isocyanate constituents and also hydroquinone monomethyl ether and 1,6-di-tert-butyl-para-cresol and the solvent butyl acetate are added thereto. The solvent is usually added in such an amount that the solids content of the binder is 70% by weight. The subsequent addition of dibutyltin dilaurate usually results in an increase in the temperature of the mixture. The mixture is, if appropriate, stirred for a number of hours at an internal temperature of 75° C. until the NCO content of the reaction mixture is essentially constant. Methanol is then added until the NCO content of the mixture is 0%. If appropriate, the amount of methanol can be slightly below or above the proportion indicated above.

The properties of a binder prepared in this way (70% strength solution in butyl acetate) were determined as follows:

Viscosity η=6.6 Pa·s (at room temperature)

Glass transition temperature $T_g$=11.3° C.

Double bond density (hydrogenation iodine number)=77 g of iodine/100 g (corresponds to a double bond density of the pure binder of 4.33 mol/kg; the calculated theoretical double bond density of the pure binder was 4.41 mol/kg)

To determine the hydrogenation iodine number, a sample of the binder was dissolved in glacial acetic acid and hydrogenated at 30° C. over palladium supported on $BaSO_4$. The iodine number was calculated from the hydrogen uptake and the double bond density was calculated from the iodine number.

The invention claimed is:

1. A flexible layer composite comprising a support and at least one layer of curable surface coating composition applied to the support, wherein the layer of curable surface coating composition comprises a binder which contains double bonds and has a double bond density in the range from 3 mol/kg to 6 mol/kg, a glass transition temperature $T_g$ in the range from −15° C. to 20° C. and a solids content in the range from 40% to 100% by weight, and is not sticky after thermal drying.

2. The layer composite as claimed in claim 1, characterized in that the binder comprises an urethane acrylate.

3. The layer composite as claimed in claim 1, characterized in that the binder has a glass transition temperature $T_g$ in the range from −10° C. to 12° C.

4. The layer composite as claimed in claim 1, characterized in that the binder having the solids content of 100% by, weight is a solid.

5. The layer composite as claimed in claim 1, characterized in that the layer of curable surface coating composition comprises at least one surface coating auxiliary.

6. The layer composite as claimed in claim 1, characterized in that the layer of curable surface coating composition comprises at least one solvent.

7. The layer composite as claimed in claim 1, characterized in that the layer of curable surface coating composition comprises pigments and/or fillers.

8. The layer composite as claimed in claim 1, characterized in that at least one removable protective layer has been applied to the layer of curable surface coating composition.

9. The layer composite according to claim 8, characterized in that the removable protective layer has a thickness in the range from 20 µm to 60 µm.

10. The layer composite as claimed in claim 8, characterized in that the at least one removable protective layer is a removable protective film.

11. The layer composite according to claim 8, characterized in that the removable protective layer has a thickness in the range from 10 µm to 100 µm.

12. The layer composite as claimed in claim 10, characterized in that the removable protective layer is a single-layer or multilayer film.

13. The layer composite as claimed in claim 10, characterized in that the removable protective film is a plastic film.

14. The layer composite as claimed in claim 13, characterized in that the plastic film is a film based on at least one selected from the group consisting of polyesters, polyolefins, polycarbonates, acrylonitrile-butadiene-styrene (ABS), acrylic-styrene-acrylonitrile (ASA), acrylonitrile-butadiene-styrene/polycarbonate (ABS/PC), acrylic-styrene-acrylonitrile/polycarbonate (ASA/PC) and polycarbonate/polybutylene terephthalate (PC/PBT).

15. The layer composite as claimed in claim 1, characterized in that the support is a single-layer or multilayer film.

16. The layer composite according to claim 12, characterized in that the film is a plastic film.

17. The layer composite according to claim 13, characterized in that the plastic film is based on at least one selected from the group consisting of polyolefins, polycarbonates, acrylonitrile-butadiene-styrene (ABS), acrylic-styrene-acrylonitrile (ASA), acrylonitrile-butadiene-styrene/polycarbonate (ABS/PC), acrylic-styrene-acrylonitrile/polycarbonate (ASA/PC) and polycarbonate/polybutylene terephthalate (PC/PBT).

18. The layer composite as claimed in claim 16, characterized in that the film contains pigments.

19. The layer composite as claimed in claim 1, characterized in that the layer of curable surface coating composition is thermally curable.

20. The layer composite as claimed in claim 1, characterized in that the layer of curable surface coating composition can be cured by means of radiation.

21. The layer composite as claimed in claim 1, characterized in that the layer of curable surface coating composition has a thickness in the range from 10 µm to 150 µm.

22. The layer composite as claimed in claim 1, characterized in that the layer of curable surface coating composition has been applied directly to the support.

23. The layer composite as claimed in claim 1, characterized in that at least one further surface coating layer is present between the support and the layer of curable surface coating composition.

24. The layer composite as claimed in claim 23, characterized in that the at least one further surface coating layer is a color- and/or effect-imparting surface coating layer.

25. The layer composite as claimed in claim 22 having the following sequence of layers:
support,
at least one layer of curable surface coating composition,
at least one removable protective layer.

26. The layer composite as claimed in claim 23 having the following sequence of layers:
support,
at least one further surface coating layer,
at least one layer of curable surface coating composition,
at least one removable protective layer.

27. A method of coating a three-dimensional shaped body comprising a step of applying the layer composite as claimed in claim 1 to the three-dimensional shaped body.

28. The method as claimed in claim 27, characterized in that the three-dimensional shaped body is a vehicle body or a part thereof.

29. A three-dimensional shaped body coated with a layer composite as claimed in claim 1.

30. A method of applying a layer composite as claimed in claim 8 in a multiple stage application process having the following steps:
removal of the protective layer from the layer of curable surface coating composition,
thermoforming of the layer composite,
final curing of the layer of curable surface coating composition.

31. A curable surface coating composition comprising
50% by weight-100% by weight of a binder which contains double bonds and has a double bond density in the range from 3 mol/kg to 6 mol/kg, a glass transition temperature $T_g$ in the range from −15° C. to 20° C. and a solids content of 40%-100% by weight,
up to 15% by weight of at least one surface coating auxiliary,
up to 60% by weight of a solvent.

32. The curable surface coating composition as claimed in claim 31, characterized in that the binder comprises an urethane acrylate.

33. The curable surface coating composition as claimed in claim 31, characterized in that the binder having the solids content of 100% by weight is a solid.

34. The curable surface coating composition as claimed in claim 31, characterized in that the solvent is an organic solvent.

35. A cured surface coating produced by curing a surface coating composition as claimed in claim 31.

* * * * *

UNITED STATES PATENT AND TRADEMARK OFFICE
CERTIFICATE OF CORRECTION

| | | |
|---|---|---|
| PATENT NO. | : 8,053,065 B2 | Page 1 of 1 |
| APPLICATION NO. | : 11/578586 | |
| DATED | : November 8, 2011 | |
| INVENTOR(S) | : Ortmeier et al. | |

It is certified that error appears in the above-identified patent and that said Letters Patent is hereby corrected as shown below:

On the title page item [73] should read

Karl Worwag Lack- und Farbenfabrik GmbH & Co. KG

Signed and Sealed this
Eighteenth Day of March, 2014

Michelle K. Lee
*Deputy Director of the United States Patent and Trademark Office*